(12) United States Patent
Yamauchi et al.

(10) Patent No.: US 7,453,240 B2
(45) Date of Patent: Nov. 18, 2008

(54) GENERATING APPARATUS AND MOTOR CONTROL APPARATUS

(75) Inventors: Tatsumi Yamauchi, Hitachiota (JP); Shinji Shirakawa, Hitachi (JP); Masahiro Iwamura, Hitachi (JP); Masamitsu Inaba, Hitachi (JP); Keiichi Mashino, Hitachinaka (JP); Keiji Kunii, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/356,075

(22) Filed: Feb. 17, 2006

(65) Prior Publication Data

US 2006/0192534 A1 Aug. 31, 2006

(30) Foreign Application Priority Data

Feb. 25, 2005 (JP) .............................. 2005-050058

(51) Int. Cl.
*H02P 3/00* (2006.01)
(52) U.S. Cl. .............................. 322/12; 322/18; 322/19; 322/28; 322/29
(58) Field of Classification Search .................. 322/12, 322/28, 19, 29, 18
See application file for complete search history.

(56) References Cited

U.S. PATENT DOCUMENTS

| 4,639,657 | A | 1/1987 | Frierdich |
| 5,850,138 | A | 12/1998 | Adams et al. |
| 5,925,939 | A * | 7/1999 | Iwatani et al. ............... 307/10.1 |
| 6,313,613 | B1 * | 11/2001 | Iwatani et al. .................. 322/12 |
| 6,344,734 | B1 * | 2/2002 | Iwatani et al. .................. 322/28 |
| 6,426,609 | B2 * | 7/2002 | Tanaka et al. .................. 322/19 |
| 7,078,880 | B2 * | 7/2006 | Potter et al. ..................... 322/4 |
| 2002/0117999 | A1 | 8/2002 | Yao et al. |

FOREIGN PATENT DOCUMENTS

| EP | 1 283 595 A2 | 2/2003 |
| JP | 02-197299 | 8/1990 |
| JP | 02-197300 | 8/1990 |
| JP | 2003-079195 | 3/2003 |

OTHER PUBLICATIONS

European Search Report dated May 8, 2008.

* cited by examiner

*Primary Examiner*—Darren Schuberg
*Assistant Examiner*—Iraj A Mohandesi
(74) *Attorney, Agent, or Firm*—Crowell & Moring LLP

(57) ABSTRACT

A generator having a field coil L, and an SW1 control circuit 2 for controlling field current flowing through the field coil L. When a generating operation of the generator is to be ended, a switch 1 SW1 is turned off to interrupt the field current flowing through the field coil L, and a switch 2 SW2 is turned off to allow the field current remaining the field coil L to the current path including a resistance element 1 with a resistance element capable of quickly attenuating the field current.

9 Claims, 9 Drawing Sheets

GENERATING APPARATUS AND MOTOR CONTROL APPARATUS

CLAIM OF PRIORITTY

The present application claims priority from Japanese application serial no. 2005-50058, filed on Feb. 25, 2005, the content of which is hereby incorporated by reference into this application.

BACKGROUND OF THE INVENTION

The present invention relates to a generating apparatus and a motor control apparatus.

Load dump surge signifies an abnormally high voltage occurring when a battery or other electric loads connected to a generator are abruptly released despite generating operation still at work resulting in closer to no load on the generator. This abnormally high voltage, if left uncontrolled, is likely to damage other devices connected to the generator. As measures against such danger it is known that, as described in the official gazettes, Japanese Application Patent Laid-Open Publication Nos. Hei 02-197299, Hei 02-197300, and 2003-79195, a zener diode is placed across the generator in order to clamp this high voltage.

A zener diode placed across the generator, for preventing a load dump surge, has been required to be large enough in heat capacity to absorb the energy obtained by calculating the product of the clamping voltage, the current through the zener diode and the load dump surge duration.

Recently, attempts have been made to assemble integrally a generator and its control board together. For this purpose it is necessary to minimize the size of the control board.

A zener diode placed across a generator, though capable of clamping a high voltage, cannot shorten its duration, posing difficulty in replacing it with another one smaller in heat capacity. This has been a problem in minimizing the size of the control board.

Also with a motor control apparatus for a motor having a field coil, there is the following problem. That is, the motor may become a generator-operation state when the motor is conversely driven by an external load (for example internal combustion engine). As this condition raises the direct current voltage, the inverter must be stopped in order to prevent any damage on devices. However, even if stopping the inverter, there is a problem that the field current is gradually attenuated, resulting in the generator still being at work.

There are also previously known systems in which, after starting an internal combustion engine by operating a motor generator (M/G) as its motor (its starter), this M/G is used as a generator. But in the systems, at the time of switching from motoring mode to generator mode, the revolution of the generator may fall, as a result, leading to a fall in the revolution of the engine, and resulting in giving a strange sensation to the operator.

SUMMARY OF THE INVENTION

An object of the present invention, therefore, is to provide a generating apparatus and a motor control apparatus capable of shortening the duration of a load dump surge, and minimizing the size of the control board by using a zener diode small in heat capacity.

Another object of the present invention is such that a motor generator is switched from motoring mode to generating mode, at this time the generator being capable of preventing a fall of the revolution of a generator.

[Means of Solving the Problems]

(1) To achieve of the first objects, the following arrangement is provided. That is, a generating apparatus comprises the following components: a generator having a field coil; a field current controller for controlling field current flowing through the field coil; and a quick field control circuit block for interrupting the field current flowing through the field coil and for allowing the field current remaining in the field coil to flow through a current path with a resistance element capable of quickly attenuating the field current.

According to the arrangement, it will be possible to shorten the duration of a load dump surge, minimize the size of the control board by using a zener diode small in heat capacity.

(2) Concerning the above-mentioned (1), it is preferable that the quick field control circuit block has a first switch connected between a first potential line and the field coil, and a second switch connected between the field coil and a second potential line in parallel with the resistance element.

The field current controller controls the field current by switching the first switch with PWM control, and turns off the first switch and the second switch when the potential of the first potential line rises above a predetermined voltage, in order to allow the field current to flow through the resistance element.

(3) Concerning the above-mentioned (2), it is preferable that the field current controller turns off the second switch simultaneously with or after turning off the first switch.

(4) Concerning the above-mentioned (1), it is preferable that the resistance element has the function of voltage clamping.

(5) Concerning the above-mentioned (4), it is preferable that a zener diode is placed between the positive electrode of the generator and the ground potential. And the clamp voltage of the above-mentioned resistance element is set to be higher than that of the zener diode.

(6) To achieve the above-mentioned other object, the following arrangement is provided. A generating apparatus comprises the following components: a generator having a field coil; a field current controller for controlling field current flowing through the field coil; a host controller capable of controlling the field current controller; and a quick field control circuit block being configured to interrupt field current flowing through the field coil and to allow the field current remaining in the field coil to flow through a current path with a resistance element capable of attenuating the field current. The field current controller controls the quick field control circuit block in accordance with an instruction from the host controller for attenuating the field current.

According to this composition, a motor generator is switched from motoring mode to generating mode, at this time the generator being capable of preventing a fall of the revolution of a generator.

(7) Concerning the above-mentioned (6), it is preferable that the motor generator is comprised of a motor generator. The host controller is configured to send the instruction at a time when the motor generator is switched from its motor mode to generator mode.

(8) To achieve the above-mentioned object according to the present invention, the following arrangement is provided. A motor control apparatus comprising: a motor having a field coil; a field current controller for controlling field current flowing through the field coil; a quick field control circuit block is configured to interrupt the field current flowing through the field coil and to allow the field current remaining in the field coil to flow through a current path with a resistance element capable of attenuating the field current. The field current controller controls, at a time of stopping an operation of the motor, the quick field control circuit block in order to attenuate the field current.

According to this composition, it-will be possible to shorten the duration of a load dump surge, minimizing the size of the control board by using a zener diode small in heat capacity.

(9) Concerning the above-mentioned (8), it is preferable that the quick field control circuit block has a first switch connected between a power supply and the field coil, a second switch connected between the field coil and a ground potential in parallel with the resistance element. The field current controller controls the field current by switching the first switch with PWN control, and turns off the first switch and the second switch when the DC voltage of said power supply rises above a predetermined voltage, in order to allow the field current to flow through the resistance element.

(10) Concerning the above-mentioned (9), it is preferable that, the field current controller turns off the second switch simultaneously with or after turning off the first switch.

DETAILED DESCRIPTION OF A PREFERRED EMBODIMENT OF THE PRESENT INVENTION

Figure 1:
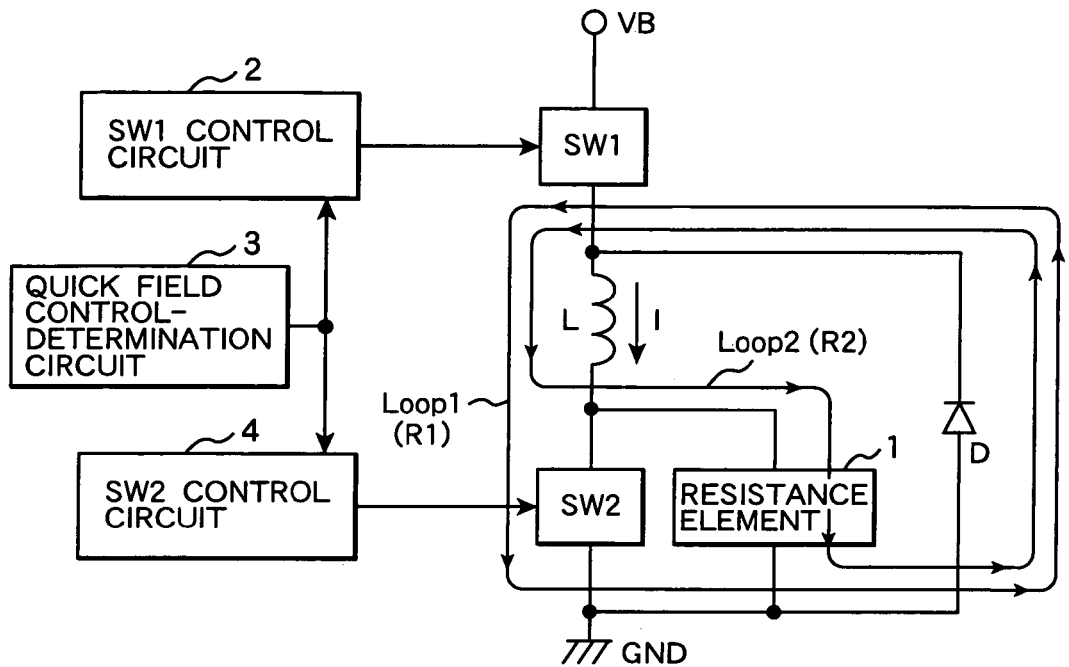
FIG. 1 is a block diagram showing a generator in a first embodiment of the present invention.

With reference to FIG. 1, now, the composition and operation of a generating apparatus in a first embodiment of the present invention will be described.

FIG. 1 is a block diagram showing the composition of the generating apparatus in the first embodiment.

A series circuit composed of a first switch SW1, a generator field coil L, and a second switch SW2 is placed between a positive potential VB (first potential line) and a ground potential GND (second potential line). The field coil L is connected in parallel to a freewheel diode D. And the second switch SW2 is connected in parallel to a resistance element 1. The first switch SW1 is controlled between on and off by a SW1 control circuit 2. The second switch SW2 is controlled between on and off by an SW2 control circuit 4. A quick field control-determination circuit 3 determines whether a quick field control is needed or not, namely whether the field current needs to be quickly attenuated. And the determination circuit 3, as result of determining, allows the SW1 control circuit 2 and the SW2 control circuit 4 to operate for their switch controls. The further operation by the quick field control-determination circuit 3 will be described later. The case in which the field current needs to be quickly attenuated, means that a battery or other electric loads connected to the generator are abruptly released and resulting in closer to no load on the generator, that is, an occurrence of a load dump surge.

Now, the operation of the generator in this embodiment will be described. In normal operation, the SW1 control circuit 2 controls field current I flowing through the field coil L by controlling a first switch (SW1) between on and off. Here, the SW2 control circuit 4 keeps a second switch (SW2) on.

In this normal operation, while the first switch (SW1) is on, the field current I flows from the positive electrode VB via the first switch (SW1), the coil L and the second switch (SW2) to the ground potential GND. While the first switch (SW1) is off, the field current flows via the freewheel diode D over a closed loop circuit as shown by Loop-1 of FIG. 1. (Strictly speaking, the resistance ratio between the on-positioned resistance of the second switch (SW2) and the resistance element 1 allows some current flow to the resistance element 1. But the on-positioned resistance being assumed to be sufficiently small in comparison with the resistance element 1, this flow will be put out of consideration in the description from now).

In this way, the current I flowing through the field coil L, is controlled by the first switch (SW1). Assuming the resistance of Loop-1 to be R1 under this condition, the smaller the resistance R1 is, the smaller the field current attenuation becomes, and the longer the current I can be maintained.

Now, the quick field control, namely the operation when the field current is quickly attenuated, will be described. The quick field control-determination circuit 3 determines whether the quick field control is needed or not, and when determining that it is needed, sends a control signal to the SW1 control circuit 2 and the SW2 control circuit 4. Then, the SW1 control circuit 2 turns off the first switch (SW1). And the SW2 control circuit 4 turns off the second switch (SW2). As a result of this, the field current I flows via the resistance element 1 on a closed loop (Loop-2). The resistance R2 of the Loop-2 circuit, owing to the resistance element 1, is set as larger than the resistance R1 of Loop-1 circuit. Because of the effect of this resistance element 1, the field current I flowing through the coil L is converted into heat and quickly attenuated.

Concerning Loop-1, the on-positioned resistance of the first switch SW1, that of the second switch SW2 and that of the freewheel diode D are smaller than the resistance of the coil L (for instance 2 Ω). Since their total resistance is so small like a few milliohms as to be negligible, the resistance of Loop-1 can be regarded as 2 Ω. Concerning Loop-2, on the other hand, assuming the resistance of the resistance element 1 to be 10 Ω, its combination with the resistance of the coil L (for instance 2 Ω) is 12 Ω. Conventionally, assuming that it would take a few hundred milliseconds for the field current attenuation, in this embodiment where the field current is quickly attenuated through the resistance element, the time for the field current attenuation can be shortened into one-third or a half as compared with the conventional way. To be more specific, conventionally, when a zener diode with a clamping voltage 40 volts is provided between both electrodes of the generator, and when the load dump surge duration is a few hundred milliseconds, the size of the zener diode is as large as 21 millimeters in diameter. The grounds for the size are obtained from a zener diode heat-capacity capable to absorb the energy calculated by the product of the clamping voltage and the load dump surge duration. Such a size becomes a bottleneck in minimizing the size of the control board of the generator.

On the other hand, in this embodiment, since the load dump surge duration is shortened into one-third of conventional some hundred milliseconds, the size of the zener diode having a heat capacity to absorb the energy can be as small as 12 millimeters in diameter. It is possible, therefore, to build the generator-control board into the inside of the front bracket of the generator, thus to compose a generating apparatus in which the generator and its control board are assembled together.

In the above-mentioned quick field control, timing where the second switch (SW2) is tuned off, is simultaneous with that of the first switch (SW1), or after that of the first switch (SW1).

In this embodiment, when the quick field control is needed, it is possible to quickly attenuate the field current I flowing through the coil L. Furthermore, it is possible to provide the generating apparatus comprising a combination generator and its control boar.

Figure 2:
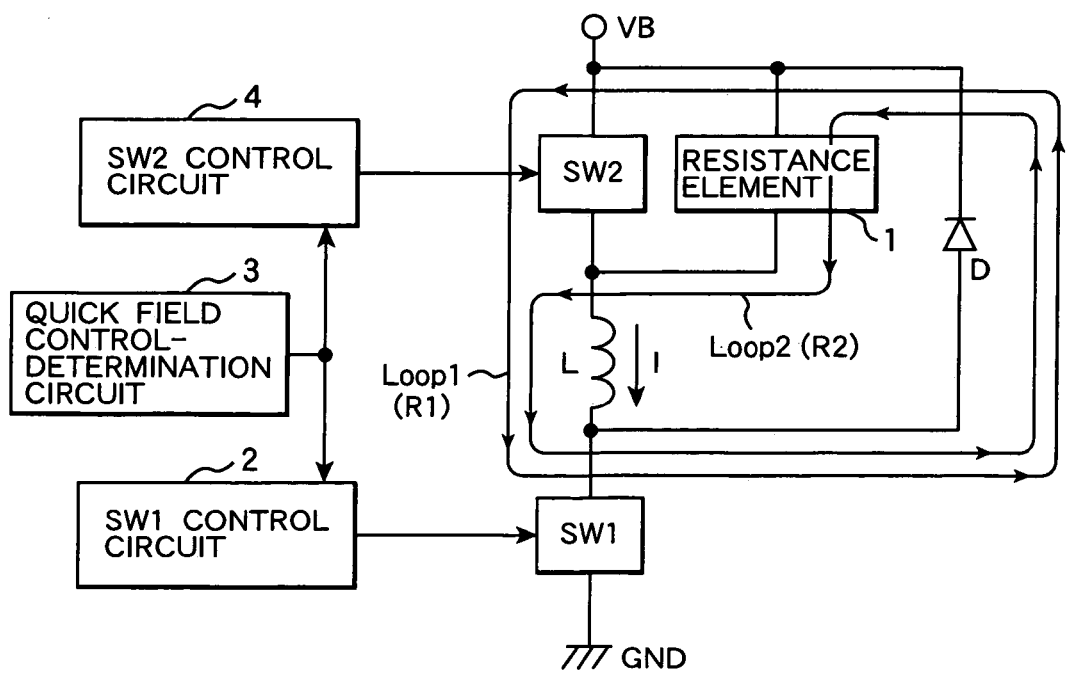
FIG. 2 is a block diagram showing a generator in a second embodiment of the present invention.

With reference to FIG. 2, now, the composition and operation of a generating apparatus in a second embodiment of the present invention will be described.

FIG. 2 is a block diagram showing the composition of the generating apparatus in the second embodiment of the present invention. In FIG. 2, components indicated by the same reference characters as FIG. 1 are identical with that of FIG. 1.

Between the potential at a positive potential VB and a ground potential GND, there is a series circuit of a second switch SW2, a generator field coil L, and a first switch SW1. In FIG. 2, the location of the switches SW1 and SW2 with respect to the field coil L is opposite in location to FIG. 1. That is, the second switch (SW2) is located on the positive potential VB side with respect to the field coil L, and the first switch (SW1) is located on the ground potential GND side. The field coil L is connected in parallel to a freewheel diode D. The second switch SW2 is connected in parallel to a resistance element 1. The first switch SW1 is controlled between on and off by a SW1 control circuit 2. The second switch SW2 is controlled between on and off by a SW2 control circuit 4. A quick field control-determination circuit 3 determines whether a quick field control is needed or not, namely whether the field current needs to be quickly attenuated. And the determination circuit 3, as result of determining, allows the SW1 control circuit 2 and the SW2 control circuit 4 to operate for their switch controls.

The operation of the quick field control-determination circuit 3 in this embodiment is the same as that of FIG. 1. When the quick field control is needed, the field current I flows via the resistance element 1 on Loop-2. Because of the effect of this resistance element 1, therefore, the field current I flowing through the coil L is converted into heat and quickly attenuated. As a result, it is possible to minimize the size of the zener diode and to build the generator-control board into the inside of the front bracket of the generator, thus to compose a generating apparatus which integrates the generator and its control board together.

In this embodiment, it is possible to quickly attenuate the field current I flowing through the coil L, thus to compose a generating system in which the generator and its control board are assembled integrally together.

Figure 3:
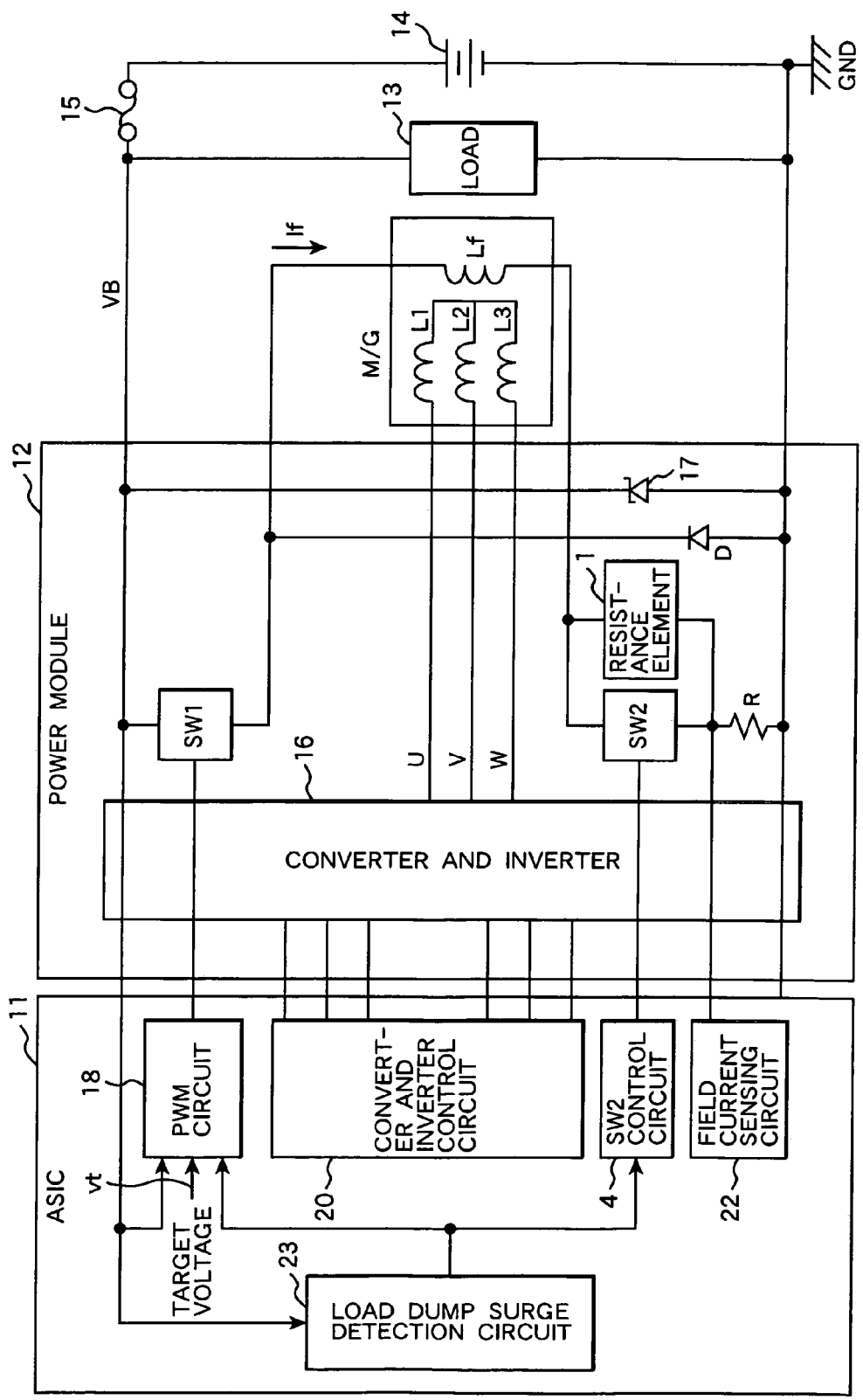
FIG. 3 is a block diagram showing the concrete composition of a generator in the first embodiment of the present invention.

With reference to FIG. 3, now, the concrete composition and operation of the generating apparatus in the first embodiment of the present invention will be described. This is an application of the quick field control circuit shown in FIG. 1 to a generator for use in automobiles.

FIG. 3 is a block diagram showing the concrete composition of a generator in the first embodiment of the present invention.

A generator controller (ASIC) 11 controls a power module 12 to control the armature current to let flow through stator coils L1, L2 and L3 of a motor generator M/G, and to control field current If flowing through a field coil (rotor coil) Lf. The motor generator M/G is connected to a load 13 such as automobile electrical accessories, and via a fuse 15 to a battery 14.

When the motor generator M/G operates as a generator, the power of an engine causes the field coil Lf to rotate, induction voltages to generate at terminals U, V and W, a converter/inverter 16 to rectify the current, and a battery 14 to be charged. Conversely, when the motor generator operates as a motor (for example starter), the converter/inverter 16 converts the direct current voltage of the battery 14 into three-phase alternating current voltages U, V and W at which currents flow to the stator coils L1, L2 and L3, causing the field coil Lf and then the engine to rotate.

The ASIC 11 has a PWM circuit 18, a converter/inverter control circuit 20, an SW2 control circuit 4, a field current sensing circuit 22 and a load dump surge detection circuit 23. The PWM circuit 18, which corresponds to the SW1 control circuit 2 shown in FIG. 1, produces a PWM signal, controls the first switch (SW1) to control the field current If. The PWM circuit 18 compares values between a positive potential VB and a target voltage Vt to execute the following operation. That is, when the positive potential VB is lower than the target voltage Vt, the PWM circuit sets the duty of the signals output from the PWM circuit 18 so as to become a higher value in order to increase the field current If and in turn the generated current. Conversely, the circuit, when the positive potential VB is higher than the target voltage Vt, sets the duty of the signals output from the PWM circuit 18 so as to become a lower value in order to reduce the field current If and in turn the generated current. In this way, feedback control is carried out so that the positive potential VB reaches the target voltage Vt. Meanwhile, the SW2 control circuit 4 sends a signal to turn on the second switch (SW2). Accordingly, the field current If flows via the second switch (SW2) and a shunt resistance R to a ground potential GND. This current, while the first switch (SW1) stays off, flows via a freewheel diode D back to the field coil Lf.

The converter/inverter control circuit 20 controls a converter/inverter 16 to carry out rectifying operation in time of generating and inverter operation in time of motoring. The field current sensing circuit 22 measures the field current according to the potential of the shunt resistance R. A zener diode 17 in the power module 12, when the positive potential rises above a predetermined voltage, provides a protection for the devices inside the ASIC 11 and the power module 12.

The load dump surge detection circuit 23, which corresponds to the quick field control-determination circuit 3 shown in FIG. 1, detects the positive potential VB rising above a predetermined voltage. When during generating operation, such equipment as the battery 14 is abruptly released in load, the positive potential VB becomes an abnormally high voltage above a predetermined one (a load dump surge). This load dump surge, because of the generation still at work despite a small load, continues its high voltage until the generation stops. While this load dump surge is under way, the generated current is consumed in the zener diode 17, and then the zener diodes 17 is put under a harsh condition of heat. This requires a zener diode large in heat capacity to be used for the zener diode 17, thus resulting in a bottleneck in minimizing the size of the generator and lowering its manufacturing cost. In order to reduce the generated current in time of a load dump surge, it may make stopping of the generating operation. In order to stop generation with the engine still at work, the load dump surge detection circuit 23 reduces the field current to zero so as to stop a magnetic field from occurring, as follows.

The load dump surge detection circuit 23, when detecting a load dump surge and determining the necessity of quick field control, sends a control signal to the PWM circuit 18 and the SW2 control circuit 4. Then, the PWM circuit 18 turns off the first switch (SW1). And the SW2 control circuit 4 turns off the second switch (SW2). As a result of this, the field current I flows via the resistance element 1, thus the field current I is quickly attenuated.

With the attenuation of the field current If, the generated current reduces, and the positive potential VB gradually returns to the normal potential. With the positive potential VB coming back to normal, the signal output from the load dump surge detection circuit 23 turns back into the original usual signal. This allows the PWM circuit 18 and the SW2 control circuit 4 to return to normal, the first switch (SW1) being under PWM control and the second switch (SW2) starting to be on. As described the above, the generator controller (ASIC) 11 is corresponding to the field current controller to be one of components of the present invention, and it served as the quick field control function with the load dump surge detection circuit. The first switch (SW1) and the second switch (SW2) are components of a quick field control circuit block.

In this embodiment, when a high voltage above a predetermined one (a load dump surge) occurs at the positive potential of a generator for use in automobiles, the field current If can be quickly attenuated (reduced). Thus, it is possible to minimize the heat capacity of a zener diode for absorbing the energy of the load dump surge, and to minimize the size of such a generator and lower its manufacturing cost, and also to implement a generating system in which the generator and its control board are assembled integrally together.

Figure 4:
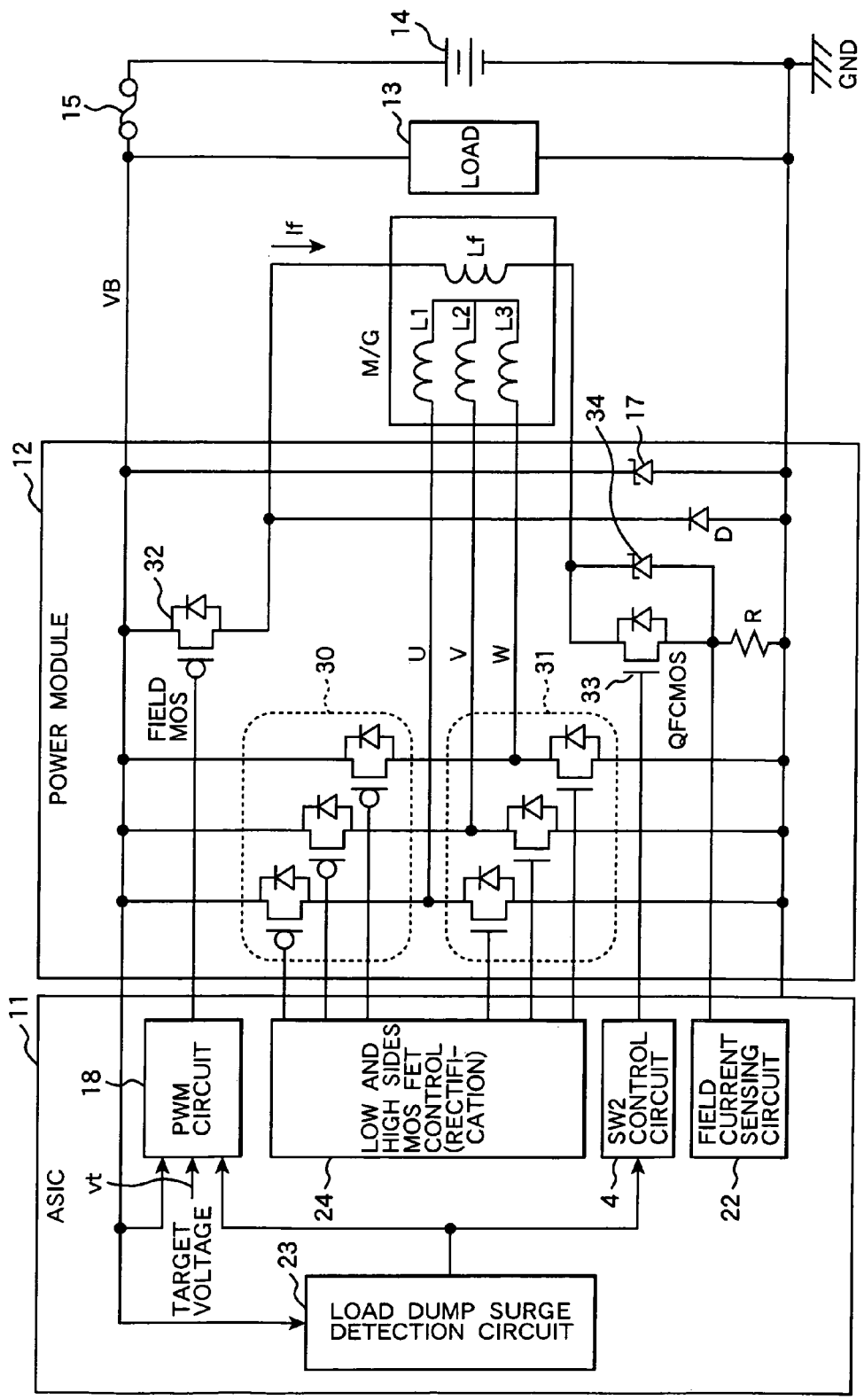
FIG. 4 is a block diagram showing the more concrete composition of a generator in the first embodiment of the present invention.

With reference to FIG. 4, now, the more concrete composition and operation of the generating apparatus in the first embodiment of the present invention will be described. This is a more concrete example of the apparatus shown in FIG. 3.

FIG. 4 is a block diagram showing the more concrete composition of a generator in the first embodiment.

A high side MOSFETs 30 made up of PMOS's and a low side MOSs 31 of NMOS's are for rectification and inverting, corresponding to the converter/inverter 16 shown in FIG. 3. A field MOS 32 for controlling field current corresponds to the first switch SW1 shown in FIG. 3. A QFCMOS 33, which turns off in time of field current attenuation, corresponds to the second switch SW2 shown in FIG. 3. A zener diode 34, when a load dump surge occurs and the QFCMOS 33 becomes turning off, operates as the resistance element 1 shown in FIG. 3.

Incidentally, in place of the zener diode 34, an intrinsic resistor also can be used as the resistance element 1. When the resistance element 1 is composed of the intrinsic resistor, its resistance decides the voltage (VL=L×di/dt) occurring across the field coil and its duration (τ=Lf/Rf). When the resistance of the element 1 is large, the current abruptly changes, as a result, a voltage (VL) is increased but the duration (τ) is reduced. When setting the resistance of the element 1 as a large value, the generated voltage (VL) becomes larger and the drain voltage of the QFCMOS 33 becomes higher. If these voltages become too high, they cross a withstand voltage of connected devices, and it is undesirable for practical use. Therefore, it is unfeasible to design the resistance indiscriminately at high level. On the other hand, if using clamp devices like a zener diode as the resistance element 1, it facilitates control in terms of the attenuation duration and the generated voltage.

In this embodiment, therefore, for the resistance element 1 the zener diode 34 is used. This allows the drain voltage of the QFCMOS 33 to be clamped by the zener diode 34, and simultaneously the zener diode 34 to work as a resistance element, thus the field current If to quickly attenuate. If the clamp voltage of the zener diode 34 is increased, as for the resistance it becomes a large resistance, the duration for the field current attenuation shortens. But, as the devices in the QFCMOS 33 are required to keep the withstand voltage, under considering trade-off, the clamp voltage of the zener diode should be set so that the resistance element 1 has the no problem resistance level. Thus considering facilitates setting of elements such as the zener diode and the QFCMOS.

In this embodiment, the composition of the resistance element using the zener diode 34 is effective in quickly attenuating the field current. Besides, since the withstand voltage of elements such as the QFCMOS 33 are set at a voltage only a little higher than the clamp voltage of the zener diode 34, such setting facilitates for designing of elements. A zener diode 17 placed between the positive potential and the ground potential needs to be specified in clamp voltage so as to protect elements in an ASIC 11 and a power module 12. On the other hand, as the clamp potential of the zener diode used as the resistance element is not directly connected to the ASIC 11, it is possible to set the clamp voltage as one only so high as to protect the QFCMOS. Such an arrangement is capable of implementing quicker field control.

In this embodiment, the resistance element for quick field control is composed of a zener diode, but as mentioned above, it may be composed of an intrinsic resistor.

Figure 5:
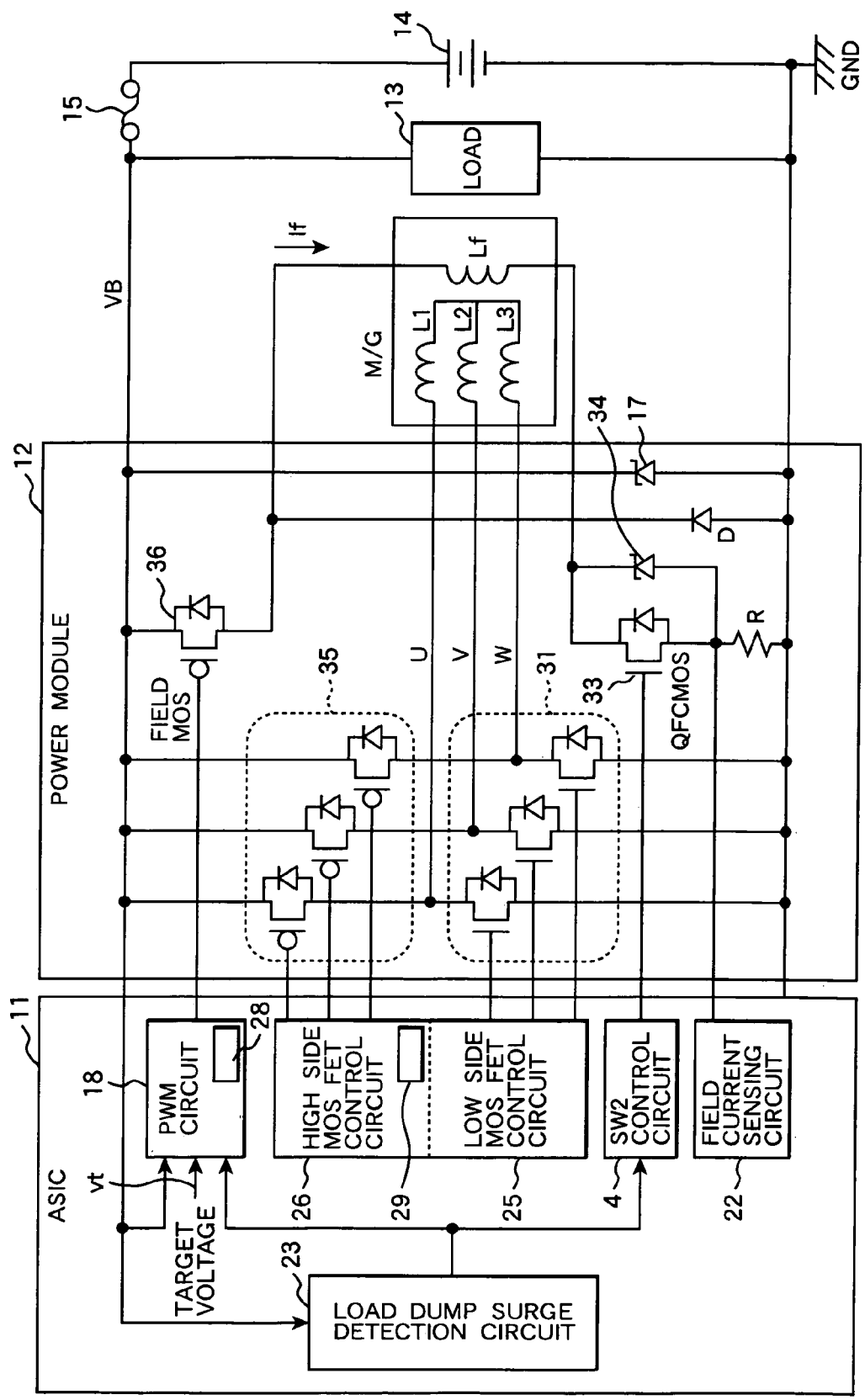
FIG. 5 is a block diagram showing another concrete composition of a generator in the first embodiment of the present invention.

With reference to FIG. 5, now, other concrete composition and operation of the generating system in the first embodiment of the present invention will be described. This is an alteration of the apparatus shown in FIG. 4.

FIG. 5 is a block diagram showing another concrete composition of the generating system in the first embodiment.

The difference from FIG. 4 is that a high side MOSFETs 35 and a field MOS 36 both in a power module 12 are composed of NMOS's. To achieve this, the PWM circuit 18 is equipped with a charge pump circuit 28 for producing a gate potential for the NMOS's. When the NMOS's are placed on the high side, their gate voltages need to be provided on the basis of their source potentials. So a floating power source such as a charge pump is required for the NMOS's. Likewise, to drive the gate for the high side MOSFETs 35, a charge pump circuit 29 is also provided in a high side MOSFET control circuit 26.

In this embodiment, a charge pump circuit is needed inside the ASIC 11, but the power module 12 can simply be composed of NMOS's, which are more reasonable in price and more varied in type than PMOS's. Consequently, such a arrangement is makes it to lower the manufacturing cost of the generating system, and enhancing the flexibility in designing it.

With reference to FIGS. 4 to 8, now, the operation of the generating system in the first embodiment shown in FIG. 4 of the present invention will be described.

Figure 6:
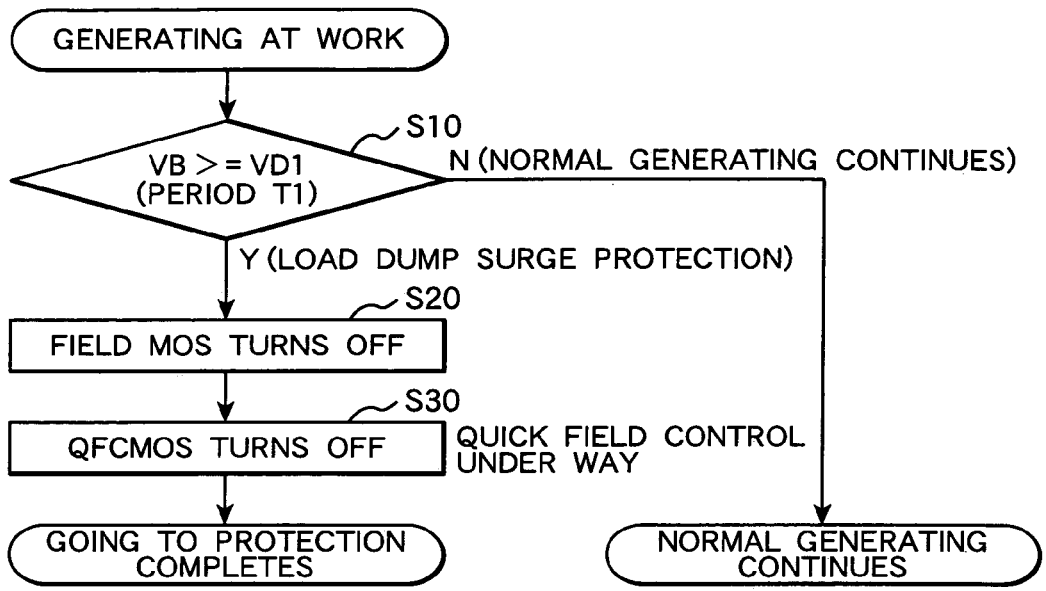
FIG. 6 is a flowchart showing that the generator in the first embodiment of the present invention goes into protection against a load dump surge.
Figure 7:
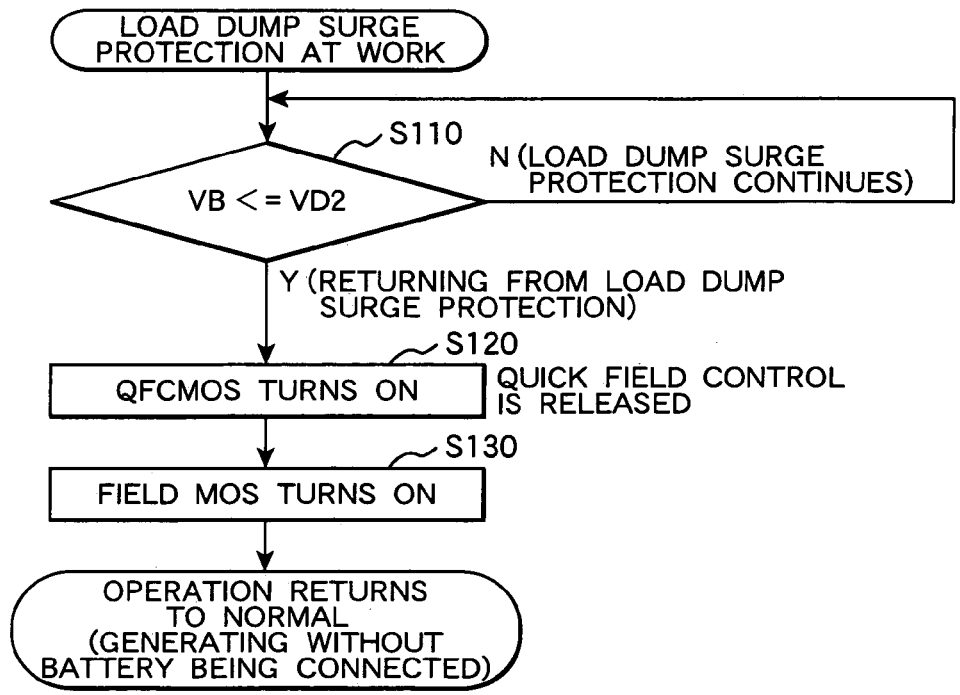
FIG. 7 is a flowchart showing that the generator in the first embodiment of the present invention returns from the protection against a load dump surge to normal.
Figure 8:
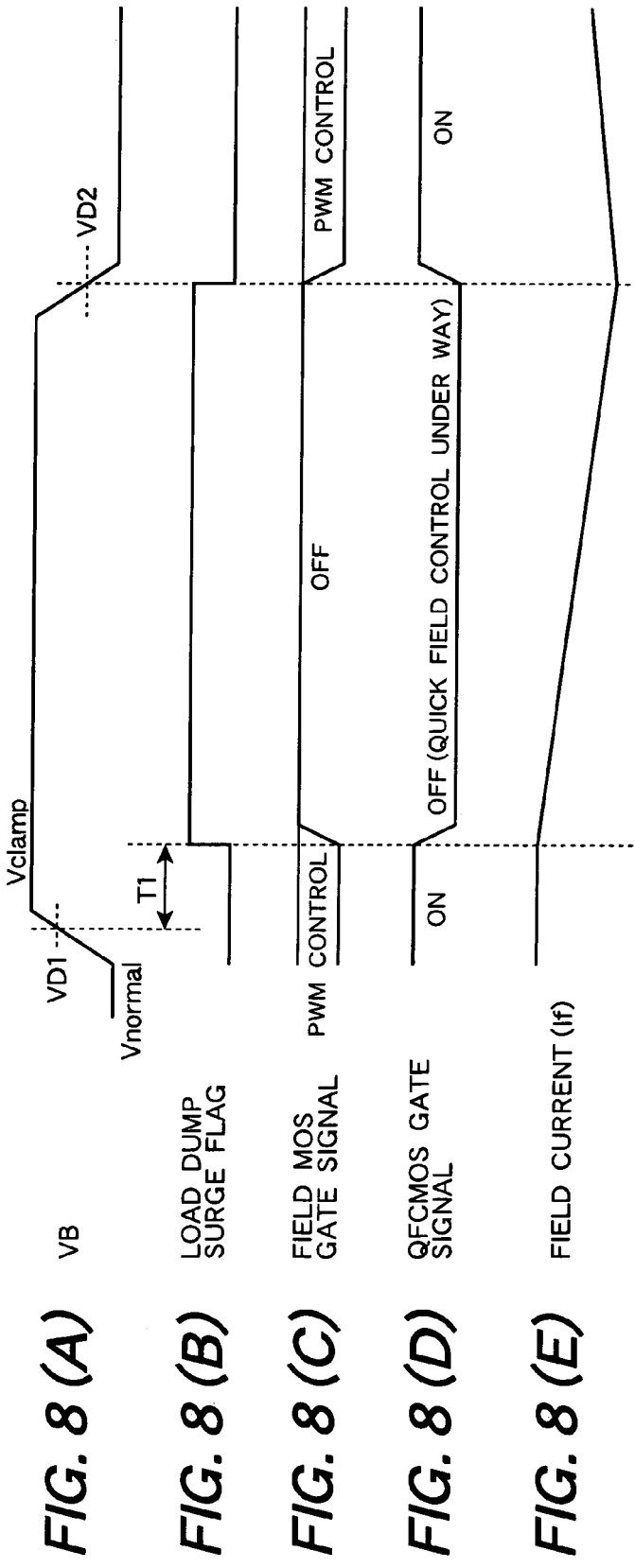
FIG. 8 is a timing chart depicting the generator in the first embodiment of the present invention.

FIG. 6 is a flowchart showing a state where the generating system in the first embodiment goes into protection against a load dump surge. FIG. 7 is a flowchart showing a state where the generating system of the first embodiment returns from protection mode against a load dump surge to normal mode. FIG. 8 is a timing chart depicting the generating system of the first embodiment. In FIG. 8, (A) shows the voltage VB, (B) the load dump surge flag, (C) the field MOS gate signal, (D) the QFCMOS gate signal, and (E) the field current If.

At a step S10 in FIG. 6, the load dump detection circuit 23, when during generating operation, as shown in FIG. 8(A), the positive potential VB continues to be VD1 or higher for a period T1, determines that a load dump surge occurs, and as shown in FIG. 8(B), changes the load dump surge flag to a high level. The period T is given for the following reason. That is, if there is no consideration for noises such as ignition noise or the like, the positive potential VB may contain noises. The period T is used for preventing from the noise influence.

And then, at a step S20, the load dump detection circuit 23 sends to the PWM circuit 18 an off instruction for the field MOS 32, and the PWM circuit 18, as shown in FIG. 8(C), turns off the field MOS 32.

And also at a step S30 the load dump surge circuit 23 sends to the SW2 control circuit 4 an off instruction for the QFCMOS 33, and the SW2 control circuit 4, as shown in FIG. 8(D), turns off the QFCMOS 33.

As shown in FIG. 8(E), this allows the field current If to quickly attenuate, the generating operation to gradually come to a stop and the positive potential VB to lower. Note that, if the positive potential VB is lower than VD1, normal generating operation continues.

Now, in FIG. 7 at a step S110, the load dump surge detection circuit 23 monitors the positive potential VB, and when, as shown in FIG. 8(A), VB becomes below VD2, determines the returning to normal generating.

And then, at a step S120, the load dump surge detection circuit 23 sends to the SW2 control circuit 4 an on-instruction for the QFCMOS 33, and the SW2 control circuit 4, as shown in FIG. 8(D), turns on the QFCMOS 33 to return to normal generating.

And at a step S130 the load dump surge detection circuit 23 sends to the PWM circuit 18 an on-instruction for the field MOS 32, and the PWM circuit 18, as shown in FIG. 8(C), turns on the field MOS 32 to start PWM control.

However, when the battery is disconnected from the generating apparatus, since there is a generating state with batteryless, the generated voltage can be not smoothed, and then there is a trend that a ripple voltage of the positive potential VB increases. And when the positive potential VB is larger than VD2, it is determined that a load dump surge is still unabated, and thus the quick field control circuit is kept in operation in which the field MOS and QFCMOS keeps "off".

The duration of a load dump surge varies with the system, but according to the conventional wisdom, continues for some hundred milliseconds. The quick field control in this embodiment can shorten the duration by a half or one-third or further less. Put otherwise, it can lower the a load dump surge energy by a half or one-third, thus can minimize the heat capacity of a zener diode on the positive potential VB for clamping, thereby implementing the minimizing of the size of such a generator and the lowering of its manufacturing cost.

Incidentally, FIG. 8 shows an example in which the field MOS 32 is a PMOS and the QFCMOS 33 is an NMOS. Depending on the use of either of a PMOS or an NMOS, the polarity of instruction signal waveform for it is decided. A condition for the load dump surge detection and a condition for the return to normal generating operation are set, for example as follows. That is, in the case of a 14-volt battery system in use for usual automobiles, VD1=26 volts, T1=200 microseconds and VD2=16.5 volts. Here, the potential VD1 of the generator positive electrode, which is a condition for operating the quick field control circuit, is set at more than twice as high as the rated voltage (12 volts for a 14-volt battery) of a vehicle-mounted battery. The reason is as follows. When the vehicle-mounted battery becomes exhausted, and when a jump-start for engine is implemented by connecting another vehicle-mounted battery and like to the exhausted battery in series, if the potential VD1 is close to the voltage for the jump-start, the quick field control circuit may malfunction. The voltage V1 is set from anti-quick field control circuit malfunction standpoint.

Figure 9:
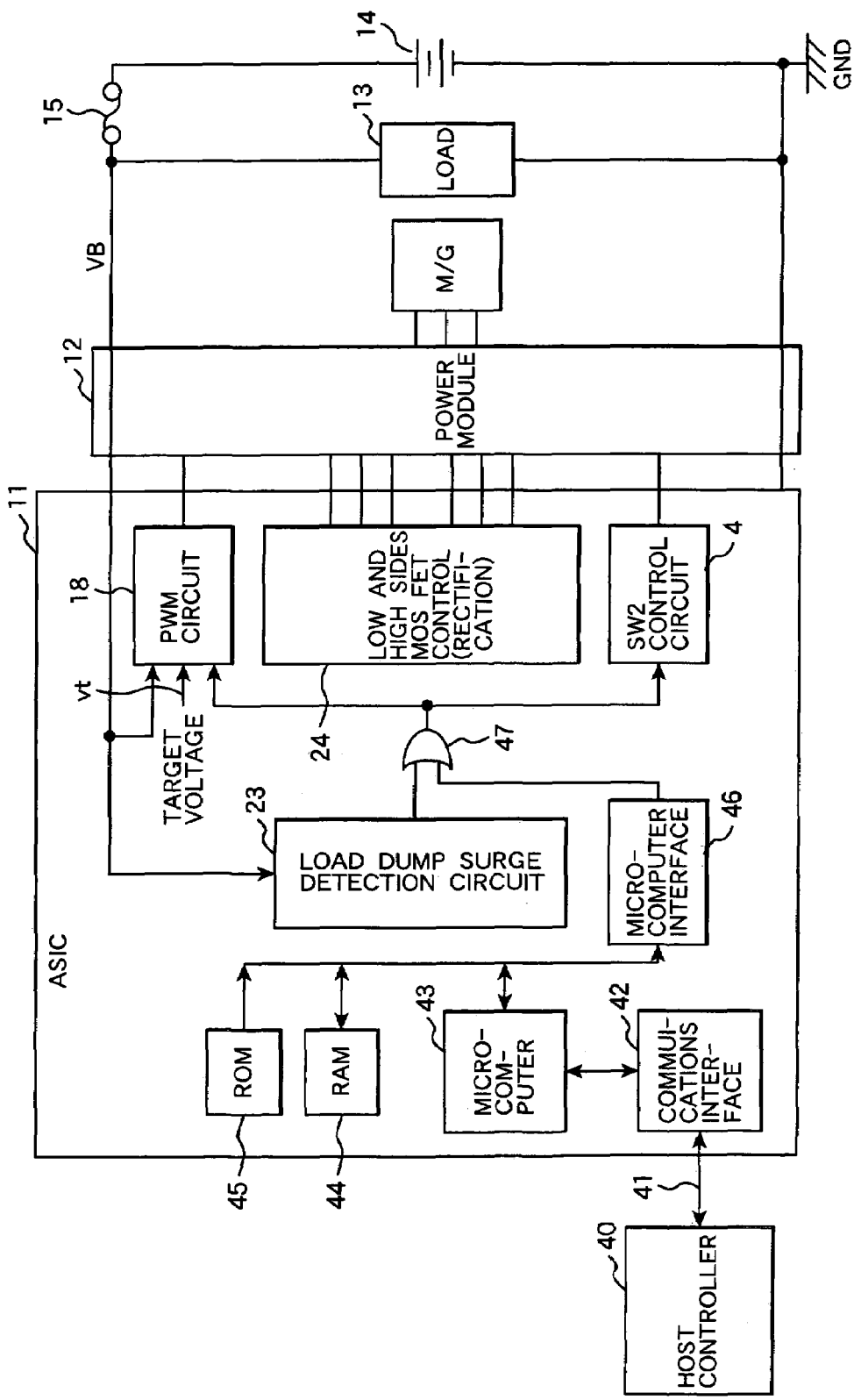
FIG. 9 is a block diagram showing the composition of a generator in the first embodiment of the present invention.
Figure 10:
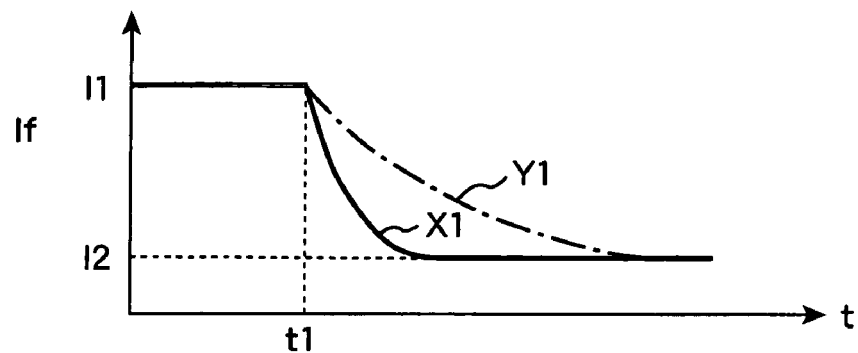
FIG. 10 is Graphs illustrating the operation of a generator in the first embodiment of the present invention.
Figure 10:
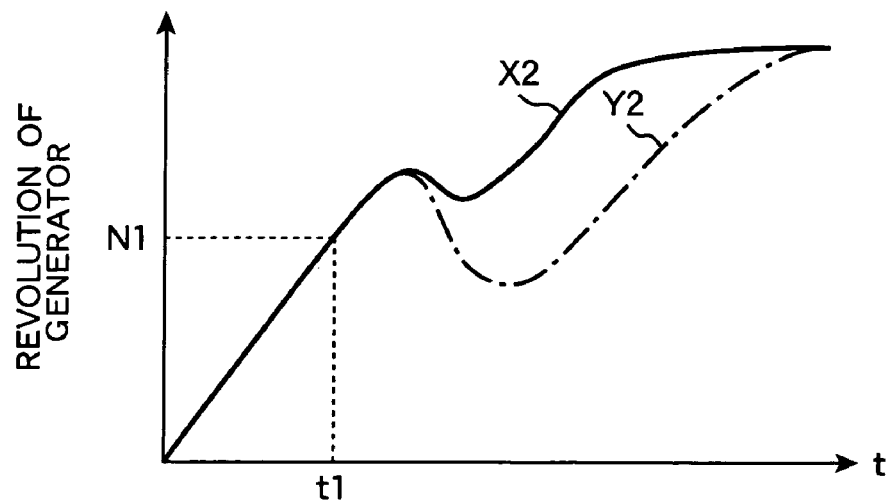

With reference to FIGS. 9 and 10, now, the composition and operation of a generating apparatus in a third embodiment of the present invention will be described. This apparatus is configured so that the quick field control is carried out by a higher level controller (host controller) than that shown in FIG. 4.

FIG. 9 is a block diagram showing the composition of a generating apparatus in the first embodiment of the present invention. FIG. 10 is graphs illustrating the operation of a generator in the first embodiment. FIG. 10(A) shows the field current If, FIG. 10(B) the revolution of the generator. In FIG. 9, components indicated by the same reference characters as FIG. 4 are identical with that of FIG. 4.

In this embodiment, in addition to the components of the embodiment shown in FIG. 4, the generating apparatus is equipped with a host controller 40 like an engine control unit (ECU), a communication line 41 for a CAN (controller area network), a LIN (local interconnect network) or some dedicated line, a communications interface 42, a microcomputer 43, a RAM 44, a ROM 45 and a microcomputer interface 46. The microcomputer interface 46 is used for interfacing signals from a microcomputer 43 to a PWM circuit 18 or an SW2 control circuit 4.

In this embodiment, an OR circuit 47 ORs the signals from a load dump surge detection circuit 23 and the microcomputer interface 46, and then sends its own output signal to the PWM circuit 18 and the SW2 control circuit 4. This arrangement can allow the quick field control circuit to operate according to an instruction from the microcomputer, in addition to the detection of a load dump surge. Consequently, the microcomputer 43 interprets instructions from the host controller 40 and can operate the quick field control based on the interpretation.

An example where the host controller 40 issues a quick field control instruction is a case when a motor generator M/G switches from motoring to generating operation. That is, motoring is carried out to start the engine, and the starting of the engine also puts generating operation into work. At this time, the larger the field current If, the greater the generated amount. Consequently, at the start of generating operation, the load on motoring increases, and then the motor revolution is decreased. Since this gives the operator a strange sensation, this phenomenon needs to be as little as possible. Here the host controller sends a quick field control instruction to the generator and restrains generating to minimize this fall in the motor revolution.

As shown in FIG. 10(A), when the motor generator M/G is used as a motor (starter) to restart the engine after an idle stop, the field current If of the M/G is set as the current I1 (for instance I1=6A). This allows the M/G to operate as a motor and, as shown in FIG. 10(B), M/G revolutions to gradually rise. When the M/G revolutions reaches N1 (assuming the M/G revolutions to be 1000 rpm and the speed reduction ratio between the engine and the M/G to be 2.5, the revolution of the engine is 400 rpm) at time t1, the M/G is changed from motoring mode to generating mode. Namely, according to conventional methods, as shown with broken lines in FIG. 10(A), the field current If is changed gradually from the current I1 to a current I2 (for instance 3A). Note that here according to conventional methods, the field current If can not reduce quickly as shown with a dash and dotted line Y1 in FIG. 10, and the field current IF is reduced gradually.

The M/G mechanically connected to the engine also rises in revolutions, as shown in FIG. 10(B), until the engine driven by the M/G reaches the idle revolution. According to conventional methods, since the field current If gradually reduces as shown with Y1 in FIG. 10(A). Here, despite the M/G entering into generating mode, the field current If stays large, the generated amount is great, and at the start of generating operation there are a rise in the load on motoring. Accordingly, as shown with a dash and dotted line Y2 in FIG. 10(B), a fall in the motor revolution occurs.

On the other hand, in this embodiment, when changing from motoring mode to generating mode, it is possible that the host controller 40 gives a quick field control instruction, thus the microcomputer 43 turns off the PWM circuit 18 and the SW2 control circuit 4. This allows the field current If, as shown with a solid line X1 in FIG. 10(A), to reduce (attenuate) the field current If more quickly than in conventional methods and to restrain the generating operation. Thereby a fall in the motor revolution can be minimized, as shown with a solid line X2 in FIG. 10(B).

This embodiment is capable of attenuating the field current of the motor generator M/G quickly, by the instruction from the host controller 40. Thereby, the host controller can allow the generating operation or the motoring operation to bring to a stop quickly.

Figure 11:
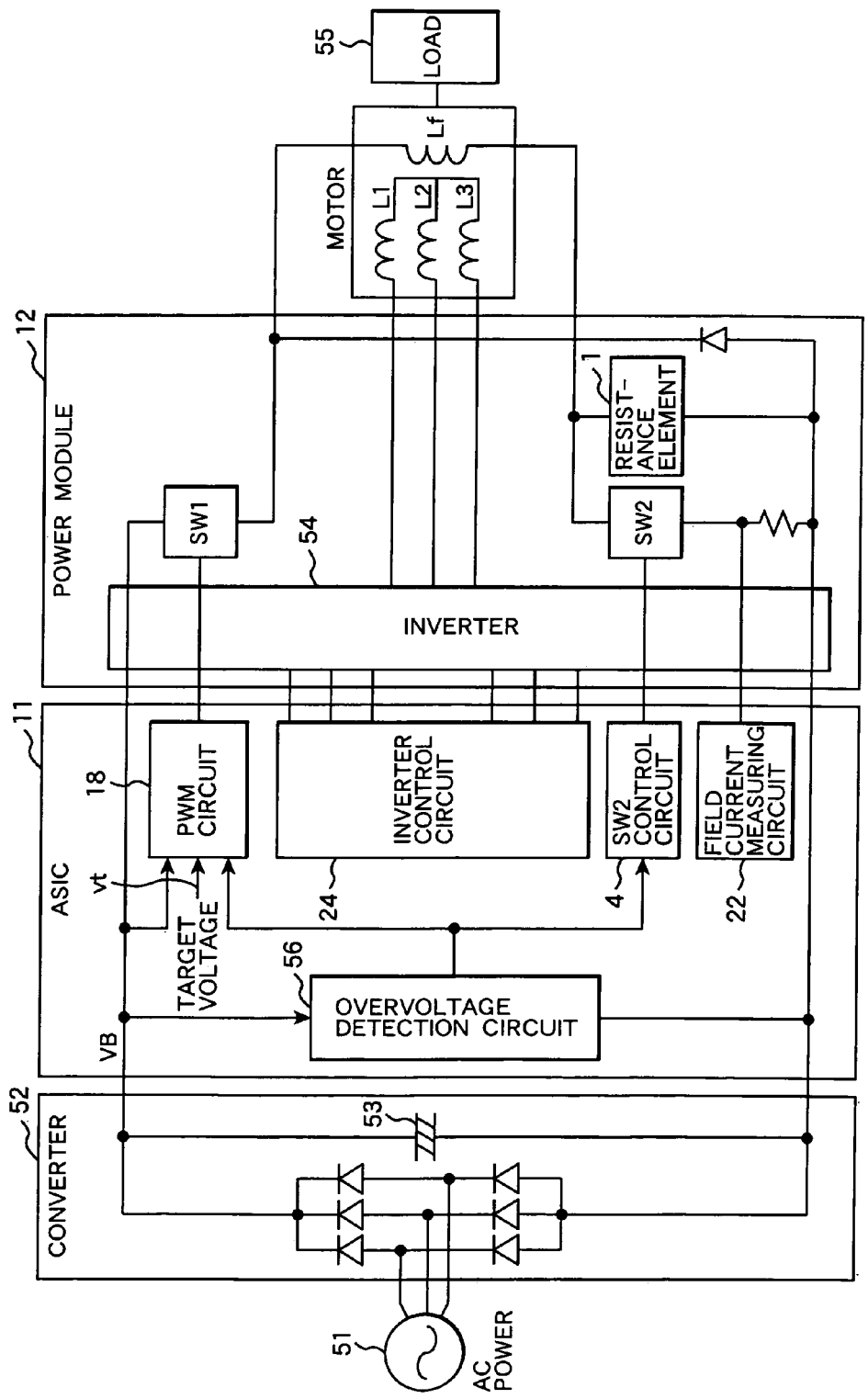
FIG. 11 is a block diagram showing the composition of a motor controller in the first embodiment of the present invention.

With reference to FIG. 11, now, the composition of a motor controller in the first embodiment of the present invention will be described. Note that a field coil Lf, a first switch SW1, a second switch SW2 and a resistance element 1 are of the same composition as in FIG. 1.

FIG. 11 is a block diagram showing the composition of a motor controller in the first embodiment.

A DC power VB is obtained by rectifying an AC power with a converter. A smoothing capacitor 53 has a capacity only large enough to smooth out a ripple voltage. An inverter 54 produces an AC voltage from the DC power VB to drive the motor, and a load 55 is a rotator connected to the rotational axis of the motor.

In the composition shown in FIG. 11, if the load is rotated by an external force for any cause, an induced voltage becomes higher than the output voltage of the inverter, and then the motor operates as a generator. Since the converter 52 has rectification performed by diodes, the generated voltage is not converted to the AC power 51, but charges the smoothing capacitor 53, and raises the DC voltage. Then, an overvoltage detection circuit 56, for preventing devices from damage, stops the inverter and simultaneously turns off the switch SW1 and the switch SW2, thus quickly attenuates the field current If and keeps the generating operation from continuing.

Note that the above description has been mainly about methods and circuits for quickly attenuating the field current of a generator for use in automobiles, and that the present invention, as stated with reference to FIG. 11, is applicable to a motor having a field coil and also to uses in general for quickly reducing a current flowing through a coil, for instance a solenoid switch controlling the current to let flow through a coil to turn on and off a switch.

According to the above-embodiments, they will be possible to shorten the duration of a load dump surge, minimizing the size of the control board by using the zener diode small in heat capacity.

Also according to the embodiments, the M/G is switched from its motoring mode to generating mode, at this time the generator being capable of preventing a fall of its revolution.

What is claimed:

1. A generating apparatus comprising:
   a generator having a field coil;
   a field current controller for controlling field current flowing through said field coil; and
   a quick field control circuit block for interrupting the field current flowing through said field coil and for allowing the field current remaining in said field coil to flow through a current path with a resistance element capable of quickly attenuating the field current.

2. A generating apparatus according to claim 1,
   Wherein said quick field control circuit block has a first switch connected between a first potential line and said field coil, a second switch connected between said field coil and a second potential line in parallel with said resistance element,
   wherein said field current controller controls the field current by switching said first switch with PWM control, and turns off said first switch and said second switch when the potential of said first potential line rises above a predetermined voltage, in order to allow the field current to flow through said resistance element.

3. A generating apparatus according to claim 2, wherein said field current controller turns off said second switch simultaneously with or after turning off said first switch.

4. A generating apparatus according to claim 1, wherein said resistance element has a function of voltage clamping.

5. A generating apparatus according to claim 4, further comprising a zener diode being placed between the first potential line and said second potential line and wherein the clamp voltage of said resistance element is set to be higher than that of said zener diode.

6. A generating apparatus comprising:
   a generator having a field coil;
   a field current controller for controlling field current flowing through said field coil;
   a host controller capable of controlling said field current controller; and
   a quick field control circuit block being configured to interrupt field current flowing through said field coil and to allow the field current remaining in said field coil to flow through a current path with a resistance element capable of attenuating the field current; and
   wherein said field current controller controls said quick field control circuit block in accordance with an instruction from said host controller for attenuating the field current.

7. A generating system according to claim 6,
   wherein said motor generator is comprised of a motor generator, and wherein said host controller is configured to send said instruction at a time when said motor generator is switched from its motor mode to generator mode.

8. A generating apparatus according to claim 1, wherein said field current controller controls said quick field control circuit block so as to form a loop including said field coil, said resistance element, and a freewheel diode for the field coil.

9. A generating apparatus according to claim 6, wherein said field current controller controls said quick field control circuit block so as to form a loop including said field coil, said resistance element, and a freewheel diode for the field coil.

* * * * *